US007457327B2

(12) United States Patent
Nakano et al.

(10) Patent No.: US 7,457,327 B2
(45) Date of Patent: Nov. 25, 2008

(54) FIBER LASER OSCILLATORS

(75) Inventors: Tomomi Nakano, Toyoake (JP); Yasuo Niino, Hoi-gun (JP); Hiromichi Ota, Kariya (JP); Yoshinobu Katoh, Toyohashi (JP)

(73) Assignee: JTEKT Corporation, Osaka (JP)

( * ) Notice: Subject to any disclaimer, the term of this patent is extended or adjusted under 35 U.S.C. 154(b) by 317 days.

(21) Appl. No.: 11/068,968

(22) Filed: Mar. 2, 2005

(65) Prior Publication Data
US 2006/0002434 A1 Jan. 5, 2006

(30) Foreign Application Priority Data
Jul. 1, 2004 (JP) ............... 2004-195523

(51) Int. Cl.
*H01S 3/30* (2006.01)
(52) U.S. Cl. ........................................ 372/6
(58) Field of Classification Search ............ 372/6
See application file for complete search history.

(56) References Cited
U.S. PATENT DOCUMENTS

| 3,273,072 | A  | * | 9/1966  | Koester et al. ............ 398/34 |
| 5,166,940 | A  | * | 11/1992 | Tumminelli et al. ........... 372/6 |
| 5,999,673 | A  |   | 12/1999 | Valentin et al. |
| 6,459,068 | B1 | * | 10/2002 | Yamaura et al. ......... 219/121.6 |
| 6,614,815 | B1 | * | 9/2003  | Kane et al. ................. 372/6 |
| 6,697,409 | B1 |   | 2/2004  | Sekiguchi |
| 2002/0001320 | A1 |   | 1/2002  | Itoh |
| 2002/0105997 | A1 |   | 8/2002  | Zhang |
| 2002/0130403 | A1 | * | 9/2002  | Onodera et al. ........... 257/680 |
| 2002/0172236 | A1 | * | 11/2002 | Sekiguchi et al. ............ 372/6 |

FOREIGN PATENT DOCUMENTS

| EP | 0 933 841 A2 | 8/1999 |
| JP | 10-190097 | 7/1998 |
| JP | 11-284255 | 10/1999 |
| JP | 2001-15835 | 1/2001 |
| JP | 2005-209948 | * 1/2004 |
| WO | WO 00/41279 | 7/2000 |

* cited by examiner

*Primary Examiner*—Minsun Harvey
*Assistant Examiner*—Delma R. Fordé
(74) *Attorney, Agent, or Firm*—Oblon, Spivak, McClelland, Maier & Neustadt, P.C.

(57) ABSTRACT

A fiber laser oscillator (1; 100) has an optical fiber (10), a pumping light emitting device (30), a light guide member (40; 140), and a core member (50). The core member (50) is configured to have a flat plate-shaped, cylindrical, annular, or hollow spherical configuration. The optical fiber (10) is wound around the surface of the core member (50) or partially embedded within the surface of the core member (50). The light guide member (40; 140) has a light receiving surface (40a) and an opposite surface (40b) opposing the receiving surface. The opposite surface (40b) of the light guide member (40; 140) contacts the circumferential surface of the core member (50). Light (Lin) emitted from the light emitting device (30) travels (i.e., pumping light (Lin)) travels within the core member (50) along the circumference of the core member (50) and excites the core portion (12) of the optical fiber (10).

19 Claims, 10 Drawing Sheets

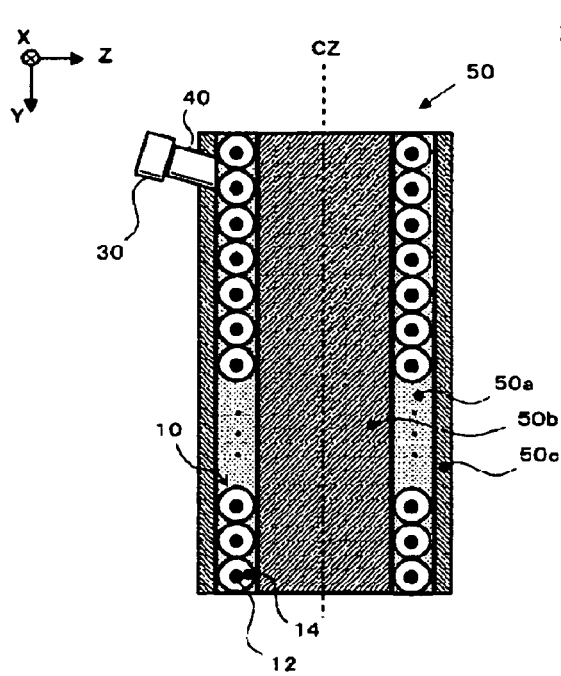
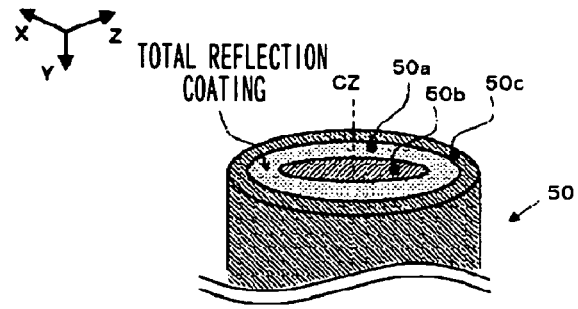
FIG. 4 (B)
FIG. 4 (A)
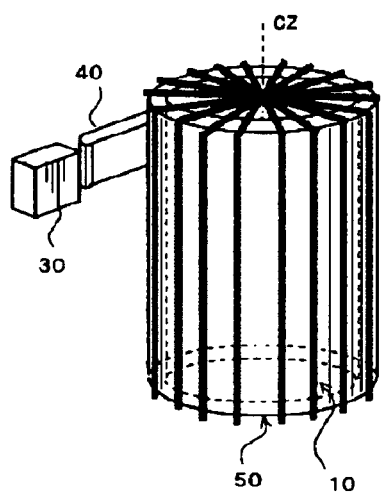
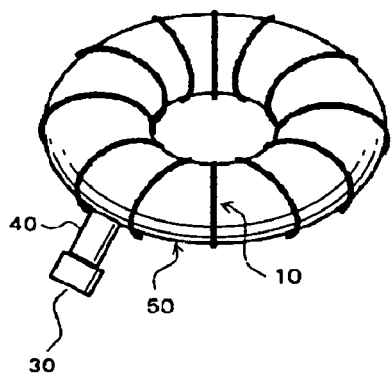
FIG. 4 (C)　　　　FIG. 4 (D)

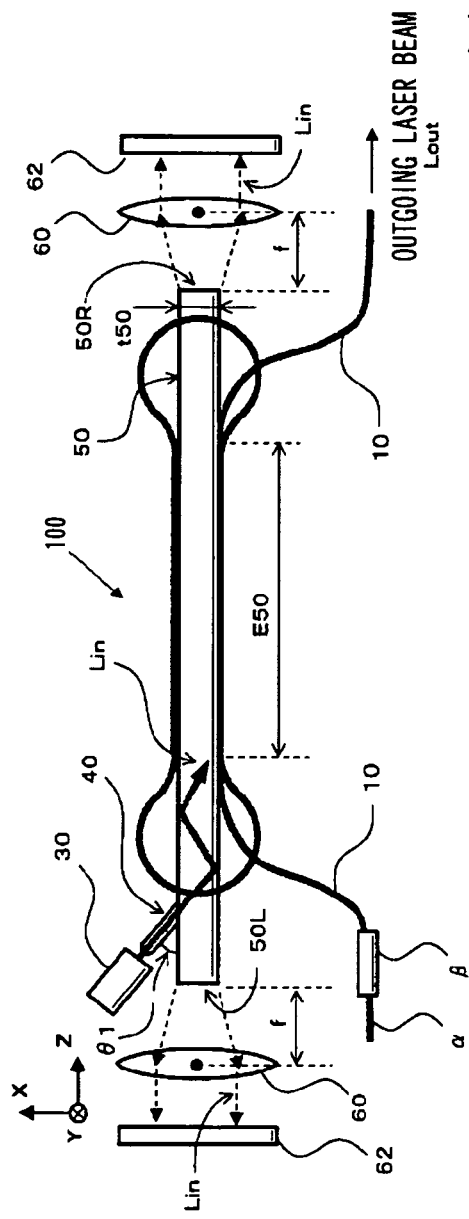
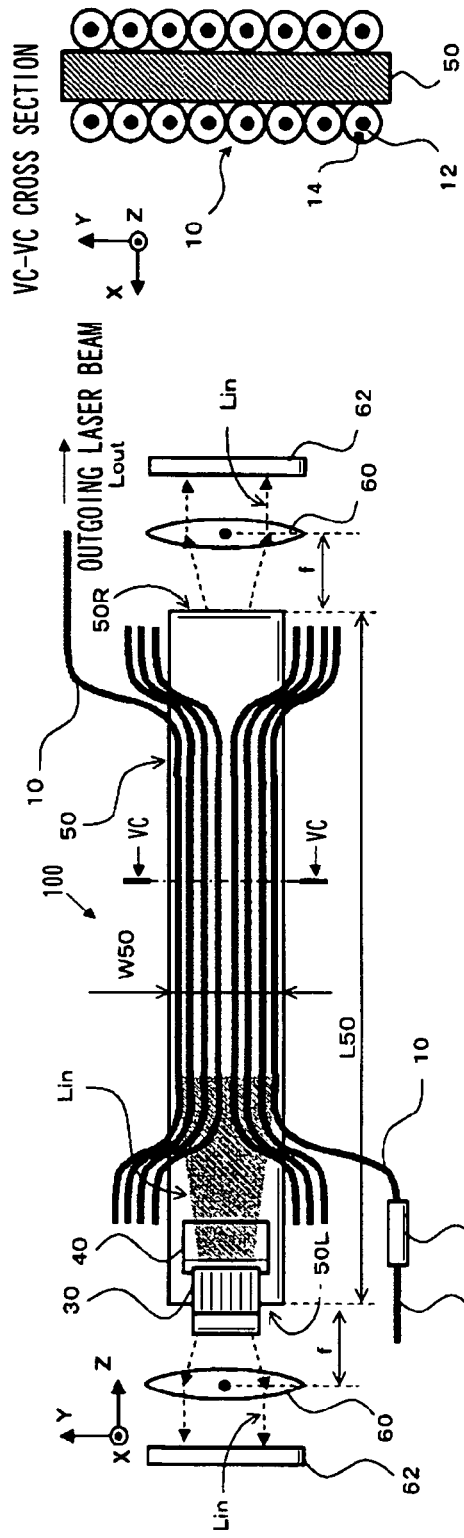
FIG. 5 (A)
FIG. 5 (B)
FIG. 5 (C)

FIBER LASER OSCILLATORS

This application claims priority to Japanese patent application serial number 2004-195523, the contents of which are incorporated herein by reference.

BACKGROUND OF THE INVENTION

1. Field of the Invention

The present invention relates to fiber laser oscillators that have an optical fiber including a core portion. The core portion contains a laser activation material so that a laser beam is generated and amplified within the core portion when a pumping light enters the optical fiber.

2. Description of the Related Art

Conventionally, a variety of fiber laser oscillators have been proposed in order to obtain a laser beam that is extremely high in quality while using a pumping light that has a relatively low beam quality.

A conventional fiber laser generator of an end pumping type generally uses an optical fiber 10 as shown in FIG. 9(C). The optical fiber 10 has a core portion 12 that is positioned centrally with respect to a cross section of the optical fiber 10. The core portion 12 may permit the transmission of a single mode laser beam and may be doped with a rare earth element (such as Nd and Er) or the like. The core portion 12 has a fiber-like configuration and may have a diameter of about 2 to 12 μm. The optical fiber 10 has a first cladding portion 14 (permitting transmission of a pumping light Lin) surrounding the core portion 12. The refractive index of the first cladding portion 14 is lower than the refractive index of the core portion 12 in order to confine an output laser beam Lout within the core portion 12. In addition, the optical fiber 10 has a second cladding member 16 surrounding the first cladding portion 14. The refractive index of the second cladding member 16 is lower than the refractive index of the first cladding portion 14, so that the pumping light Lin is confined within the first cladding portion 14.

When the pumping light Lin enters the optical fiber 10 to transmit through the core portion 12 (or collides with the core portion 12), the rare earth element contained in the core portion 12 is excited to generate the output laser beam Lout, and the single mode output laser beam Lout remains within the core portion 12. The output laser beam Lout has a relatively small diameter (which may depend on the diameter of the core portion 12) and has a relatively small divergence angle (which may depend on the wavelength of the output laser beam Lout and the refractive indexes of the core portion 12 and the first cladding portion 14). Therefore, the quality of the output laser beam Lout is extremely high. The quality of the output laser beam Lout may be represented by a product of the diameter of the outgoing light and half the divergence angle of the outgoing light. The beam quality may become higher as the product becomes smaller. However, because the area at the end surface of the optical fiber is relatively small, the energy of the pumping light Lin is relatively low. As a result, there has been a desire for an increased amount of output energy.

In this specification, the term "optical fiber" is used to mean an optical fiber having a core member and a cladding member covering the core member, for use with a fiber laser oscillator, unless otherwise indicated.

U.S. Pat. No. 5,999,673 proposes methods shown in FIGS. 8(A) and 8(B). In the method shown in FIG. 8(A), an optical fiber 10z is wound around the optical fiber 10 for use with a fiber laser oscillator and provides a guide for a pumping light to be directed to the optical fiber 10. In the method shown in FIG. 8(B), the optical fiber 10z, for providing a guide for the pumping light, extends along the optical fiber 10 and is gradually joined to the optical fiber 10 at the circumferential surface. Therefore, when the pumping light Lin enters the optical fiber 10z, the incident pumping light Lin is guided to the optical fiber 10 via the joint portion.

Japanese Laid-Open Patent Publication No. 2001-015835 proposes a laser beam generator shown in FIGS. 8(C) and 8(D), in which a core portion 12 is arranged to extend within a flat plane. In addition, prisms 4a and 4b are disposed on an upper surface of the generator so that the pumping light Lin enters via an increased area provided by the prisms 4a and 4b (in this case, the pumping light Lin enters from a circumferential surface of the optical fiber and not from an end surface). As a result, an outgoing laser beam Lout may have a relatively larger energy.

Japanese Laid-Open Patent Publication No. 10-190097 proposes a laser device shown in FIG. 9(A), in which an optical fiber 10 is coiled and then bound by a UV curable resin so as to have a configuration similar to a cylindrical block. A pumping light may be emitted from the outer peripheral side of the laser device.

Japanese Laid-Open Patent Publication No. 11-284255 proposes a fiber laser device shown in FIG. 9(B), in which an optical fiber 10 is wound around a circumferential surface of a cylindrical rod 50z made of glass. A pumping light emitted from a laser diode 30z may enter the glass cylindrical rod 50z and may be transmitted to a position adjacent to the circumferential surface of the glass cylindrical rod 50z via a collimating lens 56 and a prism 54. The pumping light transmitted to the position adjacent to the circumferential surface of the glass cylindrical rod 50z may be reflected within the glass cylindrical rod 50z, thereby pumping the wound optical fiber 10 so that a laser beam is outputted.

In general, the diameter of a core portion 12 of an optical fiber 10 is set to be about 2 to 12 μm in order to improve the quality of a generated laser beam. As noted previously, the quality of an output laser beam Lout may be represented by the product of the diameter of the outgoing light and half the divergence angle of the outgoing light. The beam quality may become higher as the product becomes smaller. The diameter of a first cladding portion 14 is set to be about several hundred to several thousand μm.

In case of the known end pumping type fiber laser oscillator shown in FIG. 9(C), the area of the end surface of the cladding portion 14, to which the pumping light Lin enters, is small. In addition, the cross sectional area of the core portion 12 is very small in comparison with the area of the end surface of the cladding portion 14. Therefore, the probability of the transmission of the pumping light Lin through the core portion 12 is low, resulting in a low oscillating efficiency. Further, it is very difficult to target the incident pumping light Lin so as to collide with the core portion 12, because the pumping light Lin is relatively low in quality. Therefore, it is very difficult to generate an output laser beam Lout with a large amount of energy.

In case of the known art disclosed in U.S. Pat. No. 5,999,673 (see FIGS. 8(A) and 8(B)), there is a limitation to the diameter of the optical fiber 10z used for providing a guide for the pumping light. Therefore, the amount of the pumping light Lin that can be entered through the optical fiber 10z is limited. In order to produce an output laser beam Lout with a large amount of energy, a large number of optical fibers 10z (i.e., such as several hundred to several thousand) must be used for connections. This may cause difficulties in manufacturing the fiber laser oscillator. Further, the fiber laser oscillator must have a relatively large size.

In addition, because of the increases in the number of parts (optical fibers 10z in this case), the probability of errors occurring may be relatively high. As a result, in some cases the pumping light Lin may not be highly effectively in entering the optical fiber 10. It is difficult to connect the optical fibers 10z so as to have the same connecting conditions for each optical fiber 10z. In addition, it is also difficult to position the optical fibers 10z so as to align with the path of the pumping light Lin. In usual cases having these types of difficulties, some degree of error is inevitable.

In case of the known art disclosed in Japanese Laid-Open Patent Publication No. 2001-015835 (see FIGS. 8(C) and 8(D)), the circumferential surface of the optical fiber, which has the core portion 12 arranged within a flat plane and covered by the cladding portion 14, is machined so as to allow placement of the prisms 4a and 4b upon the side surface. However, in order to substantially entirely absorb the pumping light Lin that enters via the prisms 4a and 4b, the device must have a considerable length in the longitudinal direction. Therefore, the device is constrained to have a relatively large size.

In addition, because the pumping light Lin must enter the prisms 4a and 4b in the form of parallel light beams, a collimating lens is required for converting the pumping light Lin to parallel beams. Consequently, additional elements, i.e., collimating lenses and prisms are required for transmitting the pumping light Lin to the optical fiber. Therefore, there exists a possibility that the oscillating efficiency may be lowered due to errors in configurations or positions of the additional elements.

In case of the known art disclosed in Japanese Laid-Open Patent Publication No. 10-190097 (see FIG. 9(A)), the pumping light Lin is emitted from the outer peripheral side of the block-like optical fiber 10. Therefore, it is not possible to completely confine the pumping light Lin. Some portion of the pumping light L may not be used for pumping. As a result, the oscillating efficiency of the device may be lowered.

In case of the known art disclosed in Japanese Laid-Open Patent Publication No. 11-284255 (see FIG. 9(B)), the pumping light Lin may enter the glass cylindrical rod 50z and may be transmitted to a position adjacent to the circumferential surface of the glass cylindrical rod via the prism 54. However, the pumping light Lin should enter the prism 54 in the form of parallel light beams. If a semiconductor laser is used for generating the pumping light Lin, the device requires a collimating lens to convert the pumping light Lin into parallel light beams. Therefore, for the same reason as discussed in connection with Japanese Laid-Open Publication No. 2001-015835, the oscillating efficiency of the device may be lowered. In addition, the volume of the core portion 12 is very small relative to the total volume of the portions through which the pumping light Lin is transmitted. The probability that the pumping light Lin collides with the core portion 12 is low. Therefore, the efficiency is low for this reason as well.

SUMMARY OF THE INVENTION

It is accordingly an object of the present invention to teach improved fiber laser oscillators that can improve oscillating efficiency and are small in size, while generating high-energy laser beams.

According to one aspect of the present teachings, fiber laser oscillators are taught that include a rod-like optical fiber, a pumping light emitting device, a light guide member and a core member. The optical fiber has a longitudinal axis and includes a rod-like core portion and a cladding portion covering the circumference of the core portion. The core portion contains laser activation material. The cladding member has a refractive index smaller than the refractive index of the core portion. The pumping light emitting device emits a pumping light that diverges in both a major axis direction and a minor axis direction as the pumping light travels from the pumping light emitting device. The light guide member provides a guide for the pumping light emitted from the pumping light emitting device. The core member receives the pumping light under the guidance of the light guide member and also confines the pumping light therein.

The core member is configured to have a cylindrical, annular, or a hollow spherical configuration. The optical fiber is positioned such that at least a part of the optical fiber is embedded within the core member or such that the optical fiber is wound around a surface of the core member.

The light guide member has a substantially flat plate-like configuration and has a pumping light receiving surface positioned adjacent to the pumping light emitting device so that the pumping light emitted from the pumping light emitting device is guided within the light guide member.

The light guide member has an opposite surface positioned opposed to the pumping light receiving surface and defining a contact surface for contacting a mating surface of the circumference of the core member. The light guide member is positioned relative to the core member such that the pumping light outgoing from the light guide member is inclined by a first predetermined angle relative to a plane tangential to the mating surface of the circumference of the core member to which the contact surface of the light guide member contacts. The pumping light guided within the light guide member enters the core member via the opposite surface contacting the core member and circulates along the circumference of the core member.

As described above, the optical fiber may be positioned such that at least a part of the optical fiber contacts with the core member or is embedded within the core member. The core member may have a cylindrical, annular, or hollow spherical configuration or such that the optical fiber is wound around the surface of the core member. Therefore, the ratio of the volume of the core portion of the optical fiber to the total transmissible volume for the pumping light (i.e., the volume of the core member) can be increased so as to increase the probability of collision of the pumping light with the core portion. As a result, the oscillating efficiency can be improved.

In addition, because the pumping light circulates along the circumference of the core member, the necessary traveling distance of the pumping light for the rod portion to be able to substantially entirely absorb the pumping light can be ensured by a suitable number of times of circulation. Therefore, the fiber laser oscillator may have a relatively small size.

Further, because the pumping light enters from the circumference of the core member, it is possible to generate a high-energy laser beam by increasing the number of streams of pumping light.

In another aspect of the present teachings, the core member has a cylindrical configuration including a top surface and a bottom surface. The pumping light enters the core member such that the pumping light circulates in the circumferential direction of the cylindrical configuration. The light guide member is further positioned relative to the core member such that the pumping light outgoing from the light guide member is inclined relative to the circumference of the core member by a second predetermined angle, as viewed in a direction perpendicular to the axis of the core member, so that the circulating pumping light is totally reflected by a surface corresponding to the top surface and/or a surface corresponding to the bottom surface of the cylindrical core member.

With this arrangement, the pumping light may circulate along the circumference of the cylindrical core member. For example, the pumping light may helically circulate. When the pumping light reaches the top surface or the bottom surface of the core member, the pumping light may be reflected to restart the helical circulation. Therefore, the necessary distance for entirely absorbing the pumping light can be obtained by a suitable number of times of circulation. As a result, the size of the fiber laser oscillator may be even further reduced. In addition, because the pumping light can uniformly enter the optical fiber due to the winding arrangement around the cylindrical core member, it is possible to prevent the optical fiber from being locally heated.

In a further aspect of the present teachings, the second predetermined angle is set to such an angle that the pumping light entering the core member does not transmit through the contact surface of the light guide member contacting the core member during a predetermined number of reciprocations of transmission of the pumping light between the top surface and the bottom surface of the core member through total reflection caused when the pumping light reaches the surface corresponding to the top surface and/or the surface corresponding to the bottom surface.

The contact surface of the light guide member for contacting with the core member may permit transmission of the pumping light from the light guide member to the core member. However, a possibility may exist that the pumping light within the core member is leaked to the outside via the light guide member. Such leakage of the pumping light may not occur if the pumping light does not transmit through the contact surface before the pumping light is substantially attenuated (i.e., during a suitable number of times of reciprocation of the pumping light). Therefore, the oscillating efficiency can be further improved.

In a still further aspect of the present teachings, fiber laser oscillators are taught that include a rod-like optical fiber, a pumping light emitting device, a light guide member, a core member, and a reflection device. The rod-like optical fiber has a longitudinal axis and includes a rod-like core portion and a cladding portion covering the circumference of the core portion. The core portion contains laser activation material. The cladding member has a refractive index smaller than a refractive index of the core portion. The pumping light emitting device emits a pumping light that diverges in both a major axis direction and a minor axis direction as the pumping light travels from the pumping light emitting device. The light guide member provides a guide for the pumping light emitted from the pumping light emitting device. The core member receives the pumping light under the guidance of the light guide member and confines the pumping light therein. The core member has an end surface extending perpendicular to a traveling direction of the pumping light within the core member. The reflection device is disposed at or adjacent to the end surface of the core member.

The core member may be configured so as to have a flat plate-like configuration. The optical fiber is turned back at a plural number of times and is positioned relative to the core member such that (1) the optical fiber has fiber portions with longitudinal axes extending parallel to the traveling direction of the pumping light that has entered the core member and (2) at least a part of each fiber portion is embedded within the core member or each fiber portion extends along a surface of the core member.

The light guide member has a substantially flat plate-like configuration and has a pumping light receiving surface positioned adjacent to the pumping light emitting device so that the pumping light emitted from the pumping light emitting device is guided within the light guide member. The light guide member has an opposite surface positioned opposed to the pumping light receiving surface and defining a contact surface contacting with a mating surface of the core member extending perpendicular to a direction of thickness of the circumference of the core member. The light guide member is positioned relative to the core member such that the pumping light outgoing from the light guide member is inclined by a first predetermined angle relative to the mating surface of the core member, so the pumping light guided within the light guide member enters the core member via the contact surface and travels within the core member in a direction perpendicular to the direction of thickness of the core member.

The reflecting device reflects the pumping light, so that the pumping light reciprocates within the core member.

With this configuration, the pumping light reciprocates within the flat plate-like core member. Therefore, the necessary distance for the entire amount of pumping light to be absorbed can be obtained by a suitable number of times of circulation. As a result, the size of the fiber laser oscillator may be further reduced.

In addition, because the pumping light can enter the core member via the surface that is perpendicular to the direction of thickness of the flat plate-like core member (i.e., a surface having a relatively large area), it is possible to increase the number of pumping light streams in order to generate a high-energy laser beam.

In a still further aspect of the present teachings, the light guide member has a cylindrical lens defining the pumping light receiving surface. The light emitting device is positioned such that the major axis direction of the emitted pumping light is perpendicular to the lens axis. The light emitting device is spaced away from the lens axis by a distance equal to or substantially equal to the focal distance. The light guide member converts the pumping light emitted from the pumping light emitting device into parallel beams in the major axis direction or converges the emitted pumping light in the major axis direction before the pumping light enters the core member.

Thus, with this construction, the pumping light enters the core member, which confines the pumping light, via the light guide member. The light guide member is a single member having the lens (i.e., a collimating lens) for converting the pumping light into either parallel beams or converged beams in the major axis direction.

Therefore, the divergence angle of the pumping light entering the core member is reduced, so that the outgoing pumping light from the core member due to exceeding the critical angle can be reduced or minimized. As a result, the oscillating efficiency can be improved.

In addition, this arrangement does not cause any misalignment of parts that may be otherwise caused if a collimating lens is provided separately from the light guide member. Therefore, the oscillating efficiency can be further improved.

In a still further aspect of the present teachings, the light guide member has a substantially cylindrical configuration. The contact surface of the light guide member is defined by at least a part of a circumferential surface of the light guide member. The mating surface of the core member is defined as either a flat surface or has a recess conforming to the configuration of the contact surface of the light guide member.

With this arrangement, the configuration of the light guide member can be further simplified. Therefore, it is possible to reduce or minimize a potential error that may be caused due to the complexity of the configuration of the light guide member. Consequently, the oscillating efficiency can be further improved.

BRIEF DESCRIPTION OF THE DRAWINGS

FIGS. 4(A) to 4(D) are explanatory views showing a practical design of the first representative fiber laser oscillator; and FIGS. 5(A) to 5(C) are explanatory views showing a second representative fiber laser oscillator.

DETAILED DESCRIPTION OF THE INVENTION

Each of the additional features and teachings disclosed above and below may be utilized separately or in conjunction with other features and teachings to provide improved fiber laser oscillators, and methods of manufacturing such fiber laser oscillators. Representative examples of the present invention, which examples utilize many of these additional features and teachings both separately and in conjunction with one another, will now be described in detail with reference to the attached drawings. This detailed description is merely intended to teach a person of skill in the art further details for practicing preferred aspects of the present teachings and is not intended to limit the scope of the invention. Only the claims define the scope of the claimed invention. Therefore, combinations of features and steps disclosed in the following detailed description may not be necessary to practice the invention in the broadest sense, and are instead taught merely to particularly describe representative examples of the invention. Moreover, various features of the representative examples and the dependent claims may be combined in ways that are not specifically enumerated in order to provide additional useful embodiments of the present teachings.

Representative embodiments of the present invention will now be described with reference to the drawings.

Representative Embodiments of Pumping Light Emitting Devices (FIGS. 10(A) to 10(E))

Figure 10:
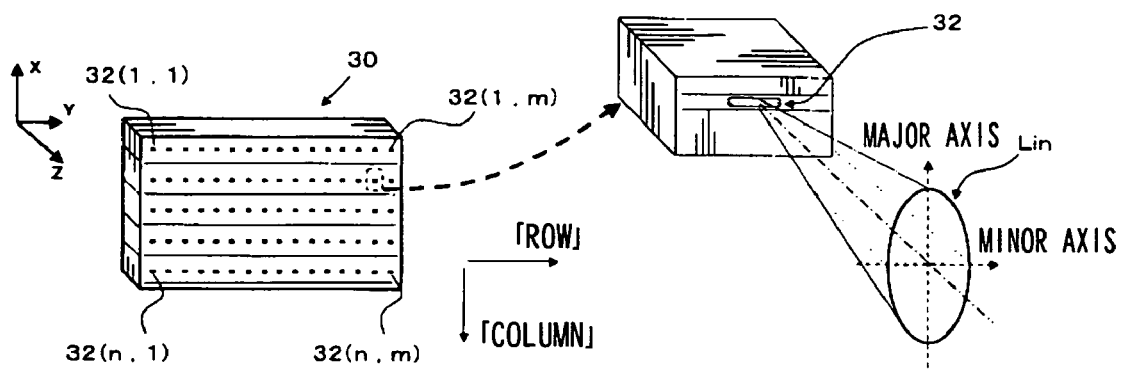
FIGS. 10(A) to 10(E) are explanatory views of semiconductor lasers that can be used for the present invention.
Figure 10:
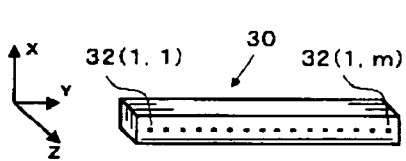
Figure 10:
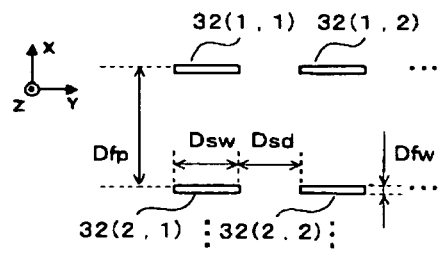
Figure 10:
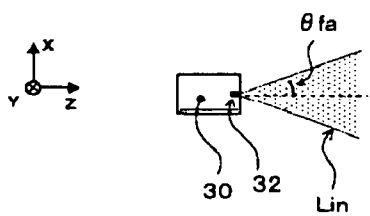
Figure 10:
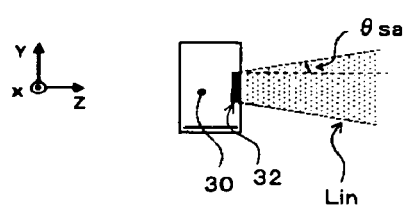

A representative pumping light emitting device 30 shown in FIG. 10 (A) is configured as a semiconductor laser for generating a pumping light Lin. As shown in FIG. 10(A), the pumping light Lin travels while forming a divergence angle with respect to both a major axis direction (i.e., an X-axis direction) and a minor axis direction (i.e., a Y-axis direction). In this representative embodiment, half the divergence angle with respect to the major axis direction (i.e., $\theta fa$ shown in FIG. 10(D)) is about 40° and half the divergence angle with respect to the minor axis direction (i.e., $\theta sa$ shown in FIG. 10(E)) is about 3.5°. In order for the pumping light Lin to enter the optical fiber, in general, a collimating lens is used for converging the pumping light Lin with respect to the major axis direction so that a parallel beam with respect the major axis direction may be produced. It is not necessary to convert the pumping light Lin with respect to the minor axis direction because the divergence angle in this direction is relatively small.

In a general semiconductor laser array having a plurality of laser emitting sections 32, the width (Dsw in FIG. 10(C)) with respect to the minor axis direction of each laser emitting section 32 is about 0.2 mm. The distance (Dsd in FIG. 10(C)) between two adjacent laser emitting sections 32 with respect to the minor axis direction is about 0.2 mm, while the distance (Dfp in FIG. 10(C)) between two adjacent laser emitting sections 32 with respect to the major axis direction is about 2 mm. The width (Dfw in FIG. 10(C)) of each laser emitting section 32 with respect to the major axis direction is about 0.002 mm. The light emitting sections 32 may be arranged in two-dimensional array to constitute the pumping light emitting device 30 in the form of a device known as a stack-type laser diode (see FIG. 10(A)). Alternatively, the light emitting sections 32 may be arranged in a single linear array in the minor axis direction to constitute the pumping light emitting device 30 in the form of a device known as an array-type laser diode (see FIG. 10(B)).

A representative light guide member and representative fiber laser oscillators will be described, in connection with embodiments incorporating the pumping light emitting device 30 shown in FIG. 10(B) (i.e., the array-type laser diode) for the purposes of explanation.

Construction and Function of a Representative Embodiment of a Light Guide Member (FIGS. 1(A) to 1(E))

FIGS. 1(A) to 1(E) are explanatory views showing the construction and function of a light guide member 40 that serves to guide the pumping light Lin (emitted from the pumping light emitting device 30) to a core member 50.

Figure 1:
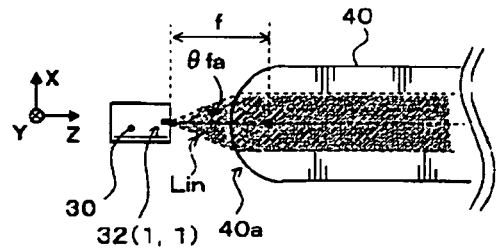
FIGS. 1(A) to 1(E) are explanatory views showing the construction and function of a representative light guide member used for a fiber laser oscillator according to the present invention.
Figure 1:
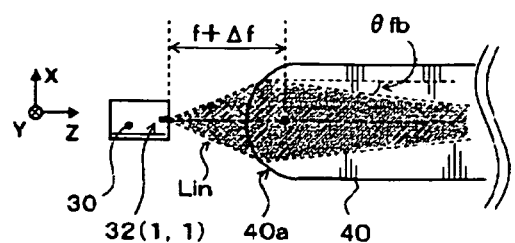
Figure 1:
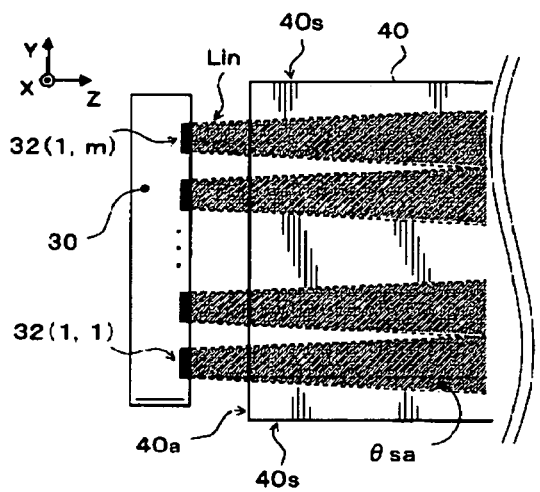
Figure 1:
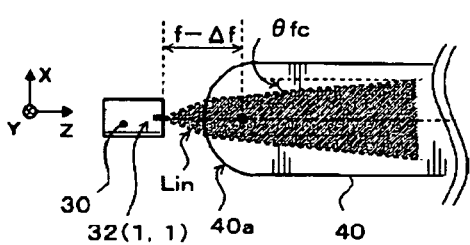
Figure 1:
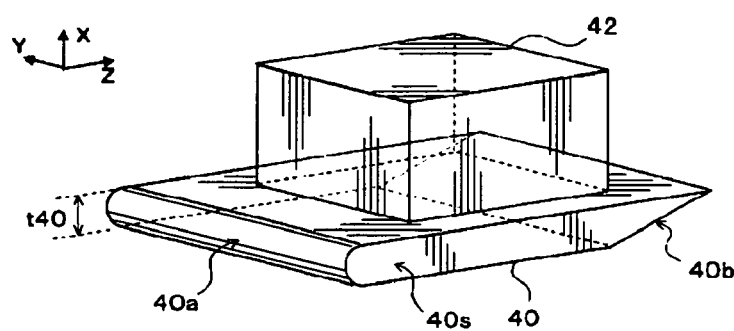

As shown in FIGS. 1(A) to 1(C), the light guide member 40 has a substantially flat, plate-shaped configuration. One side of the light guide member 40 opposing the pumping light emitting device 30 is configured as a cylindrical lens 40a. The pumping light emitting device 30 is positioned such that the major axis direction (X-axis direction shown in FIGS. 1(A) to 1(E)) of the pumping light emitting device 30 is perpendicular to the lens axis of the cylindrical lens 40a. In addition, the pumping light emitting device 30 is spaced away from the cylindrical lens 40a by a focusing distance f of the cylindrical lens 40a. With this arrangement, the cylindrical lens 40a converts the pumping light Lin emitted from the pumping light emitting device 30 into parallel light beams with respect to the major axis direction (X-axis direction in FIG. 1), and then the parallel light beams enter the remaining portion of the light guide member 40.

It is not necessary to convert the pumping light Lin into parallel light beams with respect to the minor axis direction (Y-axis direction in FIGS. 1(A) to 1(E)). Since half of the divergence angle $\theta sa$ with respect to the minor axis direction is relatively small, the refractive index n40 of the light guide member 40 is chosen such that pumping light Lin having the half divergence angle θsa is totally reflected within the light guide member 40.

Further, a block 42 may be attached to the light guide member 40 in order to facilitate the machining operation of the lens 40a, as shown in FIG. 1(C). In general, the thickness t40 of the light guide member 40 is about 0.1 mm. Therefore, there is a possibility that the pumping light Lin, after having entered the light guide member 40, exits or leaks out of the light guide member 40 if a stain or the like is present on the surface of the light guide member 40.

However, because of the incorporation of the block 42, the machining operation or the mounting operation of the lens 40a or the light guide member 40 can be conveniently performed with a reduced risk of a stain or the like becoming stuck to the surface of the light guide member 40.

The light guide member 40 may be made of a glass plate having a relatively large refractive index (e.g., such as STIH53). The block 42 may be made of a glass block having a relatively small refractive index (e.g., such as BK7).

A surface 40b on the side opposite to the lens 40a (i.e., defining a pumping light incident surface) of the light guide member 40 is adapted to contact a predetermined surface of the core member 50.

Although the pumping light emitting device 30 is spaced away from the axis of the lens 40a of the light guide member 40 by the focal distance f in the above embodiment, the pumping light emitting device 30 may be spaced away by a distance (f+Δf) that is slightly greater than the focal distance f, as shown in FIG. 1(D). Alternatively, the pumping light emitting device 30 may be spaced away by a distance (f−Δf) that is slightly smaller than the focal distance f, as shown in FIG. 1(E). Such a distance (f+Δf) or (f−Δf) between the pumping light emitting device 30 and the lens axis of the lens 40a may be chosen to enable the total reflection of the pumping light Lin, which has entered the light guide member 40, having the refractive index n40, and which is inclined relative to a plane perpendicular to the major axis direction by the angle θfb (see FIG. 1(D)) or the angle θfc (see FIG. 1(E)).

In this way, the pumping light emitting device 30 may be spaced by the focal distance f or by a distance (f+Δf) or (f−Δf) that is approximate to the focal distance, so that the pumping light Lin entering the light guide member 40 is converted into the parallel beam (see FIG. 1(A)) or a concentrated beam (see FIGS. 1(D) and 1(E)).

In the above description, the lens 40a having a cylindrical configuration is formed on the light guide member 40 in order to define a pumping light incident surface. However, a flat pumping light incident surface may be used without the need of the lens 40a by positioning the pumping light emitting device 30 adjacent to the flat pumping light incident surface, if the refractive index of the light guide member 40 is large enough to largely refract the incident pumping light Lin for concentrating within the light guide member 40. However, the following description of representative fiber laser oscillators will be made in connection with the use of the light guide member 40 having a lens 40a as an example.

First Representative Fiber Laser Oscillator (FIGS. 2(A) to 2(E) and FIGS. 3(A) to 3(D))

FIG. 2(A) shows a schematic external view of a first representative fiber laser oscillator 1. An optical fiber 10, a pumping light emitting device 30, a light guide member 40, and a core member 50, constitute the fiber laser oscillator 1. The optical fiber 10 has a cylindrical core portion 12. The core portion 12 is doped with laser activation material such as rare earth elements (e.g., Nd, Er) and extends in the longitudinal direction of the optical fiber 10. A cladding portion 14, having a refractive index smaller than a refractive index of the core portion 12, surrounds the core portion 12 by covering the circumference of the core portion 12, so as to configure the cylindrical optical fiber 10. The optical fiber 10 may have other configurations, e.g., such as a polygonal rod, in addition to a cylindrical configuration.

Figure 2:
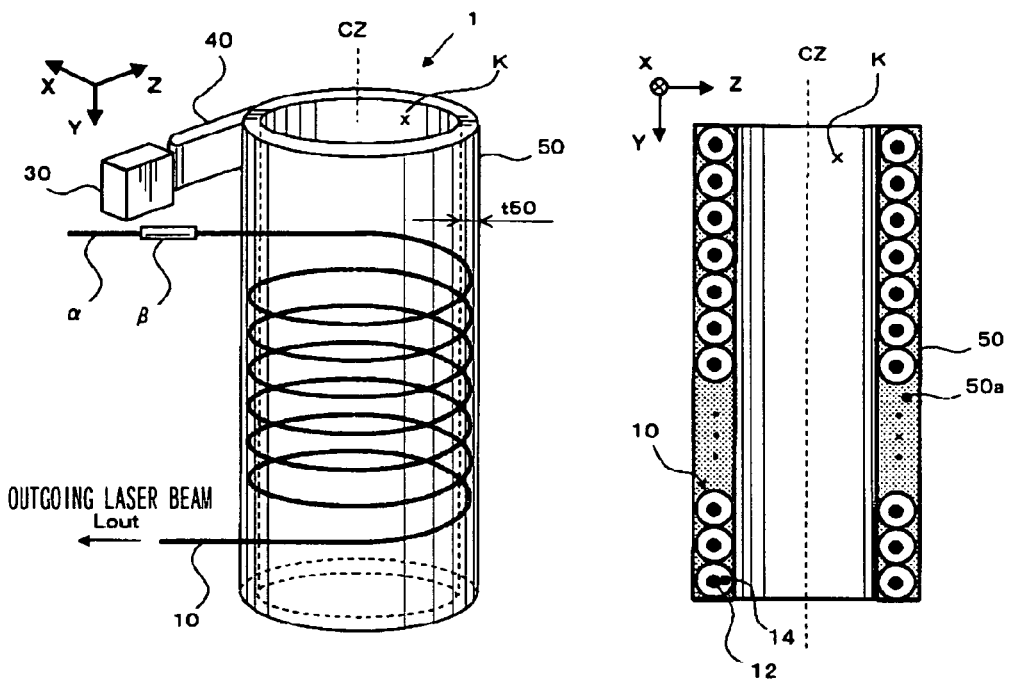
FIGS. 2(A) to 2(E) are explanatory views showing a first representative fiber laser oscillator.
Figure 2:
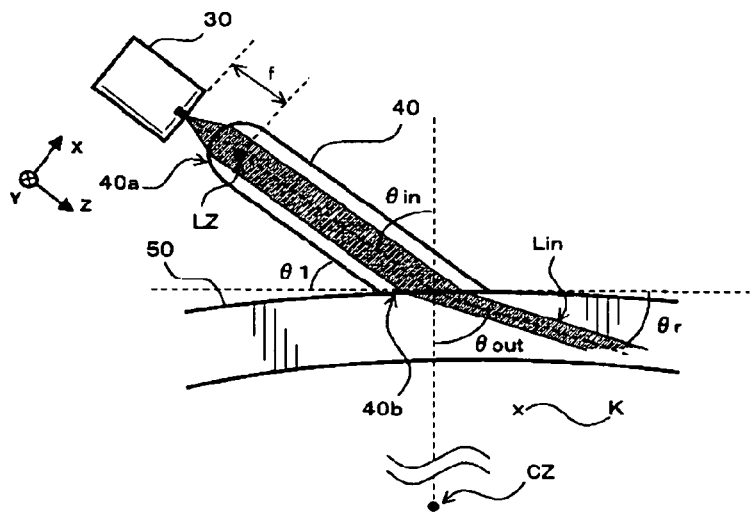
Figure 2:
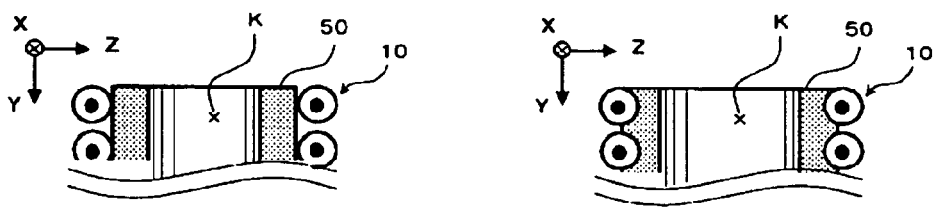

The pumping light emitting device 30 and the light guide device 40 will not be described in detail since they have been previously described. In FIG. 2, the block 42 attached to the light guide member 40 has been eliminated for the purposes of illustration.

The core member 50 has a substantially cylindrical configuration and is made of a material that can confine the incident pumping light Lin within the inside of the core member 50. For example, such a material may have a refractive index substantially equal to the refractive index of the cladding portion 14. Here, the term "inside of the core member 50" is used to mean a solid region excluding the cylindrical hollow region K, and defined between the inner wall and the outer wall of the core member 50. The pumping light Lin is emitted to enter the core member 50 such that the pumping light Lin circulates around the inside of the core member 50 substantially in the circumferential direction (i.e., along the outer periphery). Therefore, the pumping light Lin may not pass through the hollow region K.

The optical fiber 10 may be disposed within the core member 50, as shown in FIG. 2(B), and extends helically along the circumference of the core member 50. Coiled portions of the optical fiber 10 are arranged parallel to each other in the direction of the path of the incident pumping light Lin. Alternatively, the optical fiber 10 may extend helically such that the coiled portions are arranged parallel to each other in a direction inclined by a predetermined angle relative to the path of the incident pumping light Lin. An outgoing laser light Lout exits one end of the optical fiber 10. A fiber Bragg grating α (hereinafter referred to as FBGα) is connected to the other end of the optical fiber 10 via a fiber connector β in order to reflect the outgoing laser light Lout. However, the FBGα and the fiber β may be eliminated, and in this case the outgoing light Lout may also exit the other end of the optical fiber 10.

Alternatively, the optical fiber 10 may extend helically along the surface (i.e., the outer circumferential surface) of the core member 50 while it contacts the surface of the core member 50 as shown in FIG. 2(D). Otherwise, the optical fiber 10 may be partly embedded within the core member 50 as shown in FIG. 2(E).

In the embodiment shown in FIG. 2(B), which shows the cross sectional view of the core member 50 taken along a plane including the central axis CZ, the core member 50 has a hollow portion K defined therein and the optical fiber 10 is embedded within the core member 50, as previously described.

The light guide member 40 is positioned such that the surface 40b, opposite to the lens 40a, contacts a portion of the outer circumferential surface of the core member 50. In addition, the axis LZ of the lens 40a extends substantially parallel to the axis CZ, as shown in FIG. 2(C). More specifically, the light guide member 40 is positioned relative to the circumferential surface of the core member 50 such that the light guide member 40 is inclined relative to the circumferential surface of the core member 50 (i.e., a tangential line extending from the contact portion of the core member 50) by a first predetermined angle θ1 as viewed in a direction parallel to the axis CZ of the core member 50. More specifically, the first predetermined angle θ1 is set such that an angle θr between the pumping light Lin (within the core member 50) and the circumference of the core member 50 provides total reflection of the pumping light Lin within the core member 50. Preferably, the refractive index of the core member 50 may be chosen to be smaller than the refractive index of the light guide member 40, so that an outgoing angle θout of the pumping light Lin becomes greater than an incident angle θin, as shown in FIG. 2(C). As a result, the angle θr between the pumping light Lin and the circumference of the core member 50 becomes smaller.

In order to position the light guide member 40 relative to the core member 50, a ceramic precursor, i.e., such as polysilazane, having a refractive index equal to or substantially equal to the refractive index of the light guide member 40, may be used for fixing the position (through bonding).

Figure 3:
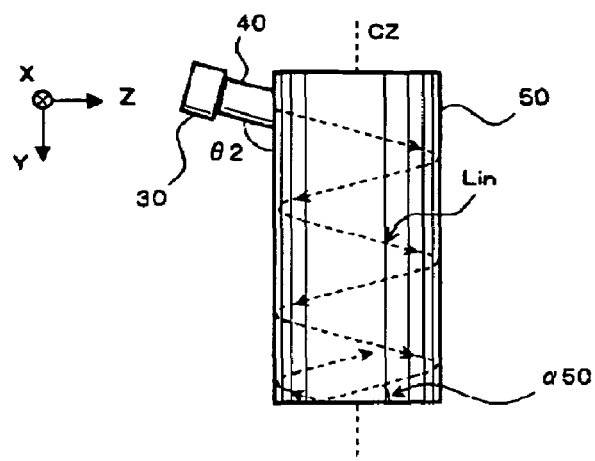
FIGS. 3(A) to 3(D) are explanatory views illustrating the traveling direction of pumping light in the first representative fiber laser oscillator.
Figure 3:
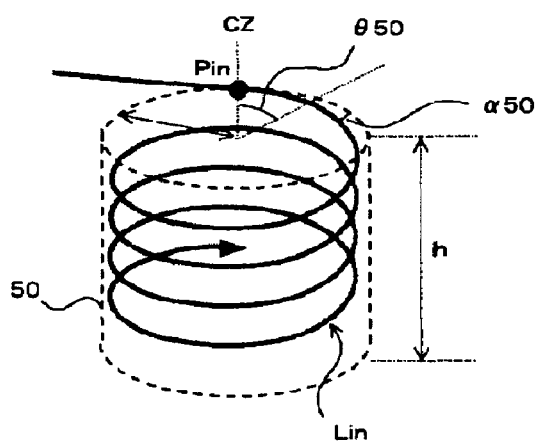
Figure 3:
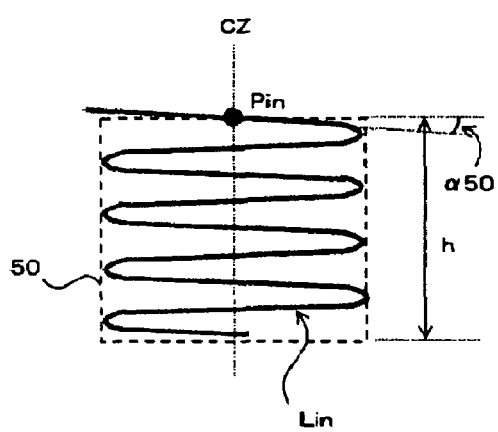
Figure 3:
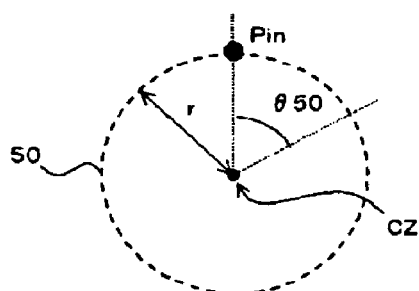

FIG. 3(A) shows the core member 50 as viewed from a direction perpendicular to the axis CZ. As shown in FIG. 3(A), the pumping light emitting device 30 and the light guide member 40 are positioned to be inclined by a second predetermined angle θ2 relative to the circumference of the core member 50, as viewed from the direction perpendicular to the axis CZ. The second predetermined angle θ2 is set such that the pumping light Lin that helically circulates on or within the core member 50 is totally reflected when the pumping light Lin reaches the bottom surface (or the top surface) of the core member 50. Alternatively, a total reflection coating may be formed on the bottom surface (or the top surface) in order to totally reflect the pumping light Lin.

The transmission of the pumping light Lin within the core member 50 will now be described with reference to FIGS. 3(B), 3(C), and 3(D). In FIGS. 3(B) to 3(D), "Pin" indicates an incident position of the pumping light Lin at the circumference of the core member 50 (i.e., a set position of the light guide member 40). "α50" indicates an angle between the pumping light Lin entering with the second predetermined angle θ2 and the bottom surface (or the top surface) of the core member 50. The angle α50 is set such that the following relational expression is not established:

$$\tan(\alpha 50) = 2h/(2\pi r * n)$$

Here, "r" and "h" respectively are a diameter and a height of the core member 50. "n" is a positive integer. In this embodiment, the position Pin is set at the top surface of the core member 50. Therefore, the distance between the position Pin and the bottom surface of the core member 50 corresponds to the height "h".

If the above expression is established, there is a possibility that the pumping light Lin reflected at the bottom surface of the core member 50 reaches to (i.e., transmits through) the position Pin so that the pumping light Lin may go outside through the light guide member 40. On the contrary, if the above expression is not established, the pumping light Lin may not transmit through the position Pin and the pumping light Lin vertically reciprocates within the core member 50 while the pumping light Lin helically circulates without outgoing from the core member 50. Therefore, the pumping light Lin can be reliably confined within the core member 50.

"n" in the above expression is a positive integer and may take an infinite number of integers. Therefore, it is difficult to inhibit the establishment of the expression for all of possible integers "n". However, the pumping light Lin may become attenuated as it reciprocates vertically (i.e., transmitting from the top surface to the bottom surface and then from the bottom surface to the top surface of the core member 50) while causing excitation or pumping of the optical fiber 10. Therefore, it may be sufficient if the above expression is not established for limited number of integers "n" (e.g., 1 through 10) that corresponds to a predetermined number of reciprocations of the pumping light Lin before the pumping light Lin is sufficiently attenuated. In this way, the angle a50 can be set to inhibit the transmission of the pumping light Lin through the contact surface between the light guide member 40 and the core member 50 (i.e., the position Pin) during the reciprocation of the pumping light Lin by the predetermined number.

FIGS. 4(A), 4(B), 4(C), and 4(D), show a practical design of the first representative fiber laser oscillator 1, which design facilitates the manufacturing of the first representative fiber oscillator 1.

First, a solid cylindrical core 50b is prepared. Then, the optical fiber 10 is helically wound around the circumference of the core 50b. Thereafter, a transparent portion 50a made of ceramic precursor, e.g., such as polysilazane, is formed so as to cover the circumference of the core 50b and the wound optical fiber 10. The transparent portion 50a may be further covered by a protective portion 50c in order to prevent or minimize the influence of any contaminants such as dust. The transparent portion 50a, the core 50b, and the protective portion 50c, all form the core member 50 in this design.

Assuming that the transparent portion 50a, the core 50b, the protective portion 50c, the core portion 12 of the optical fiber 10, and the cladding portion 14, respectively have refractive indexes n50a, n50b, n50c, n12, and n14, then these refractive indexes are set to satisfy the following relational expressions:

$$n4, n50a > n50b, n50c \text{ and}$$

$$n12 > n14$$

Here, n14 may be greater, smaller, or equal to n50a. Similarly, n50b may be greater, smaller, or equal to n50c. The pumping light Lin may be confined to only within the transparent portion 50a with settings that satisfy the above expressions. The pumping light Lin may not be transmitted through the core 50b.

Preferably, the top surface and the bottom surface of the transparent portion 50a are coated with coatings that totally reflect the pumping light Lin. In order to assemble the light guide member 40 to the core member 50, a part of the protective portion 50c is removed so that the light guide member 40 contacts the transparent portion 50a at a suitable position.

In addition, the circumferential surface of the core portion 50b and the inner circumferential surface of the protective portion 50c may be coated with coatings that provide mirror surfaces for totally reflecting the pumping light Lin.

Further, the core 50b may be made of a material that can be removed after the transparent portion 50a has been solidified. For example, the core 50b may be made of resin, e.g., polyimide resin, which is soluble in a suitable solvent. Alternatively, the core 50b and the transparent portion 50a may be formed with a water-soluble plastic film interleaved therebetween, so that the core 50b may be separated from the transparent portion 50a by dissolving the plastic film with water. Otherwise, if the transparent portion 50a is made of UV-curable resin, the core 50b and the transparent portion 50a may be formed while a material, such as polypropylene, that is not bondable to the UV-curable resin, is interleaved therebetween. Therefore, the formed transparent portion 50a may be separated from the interleaved material and the formed core 50b.

In case of the first representative fiber laser oscillator 1 having the hollow portion K within the core member 50, as shown in FIGS. 2(A) to 2(E), it is possible to provide a cooling medium flow, e.g., such as cooling water and cooling air, through the hollow portion K in order to cool the core member 50 and consequently the fiber laser oscillator 1. Cooling is advantageous in enabling an increase in the number of beams of the incident pumping light Lin and in obtaining an increased output of the outgoing laser light Lout.

FIG. 4(C) shows an alternative arrangement of the optical fiber 10. In this arrangement, the optical fibers 10 extend along the circumference of the core member 50 in a direction parallel to the axis CZ of the core member 50. FIG. 4(D) shows another alternative arrangement that corresponds to the arrangement shown in FIG. 2(A) where the top surface and the bottom surface of the core member 50 are connected to each other so as to give an annular configuration to the core member 50. Although not shown in the drawings, the optical fiber 10 may also be wound around a spherical core. Then, a hollow transparent portion may be formed around the spherical core so as to form a fiber laser oscillator having a hollow spherical core member.

If the core member 50 is formed to have an annular configuration, it is not necessary to totally reflect the pumping light Lin at the top and bottom surfaces as in the cylindrical configuration. Therefore, any potential loss of the output due to reflection of the pumping light Lin can be eliminated to further improve the oscillation efficiency.

In case that the core member 50 is formed so as to have an annular configuration or a hollow spherical configuration, the light guide member 40 may be positioned such that it is inclined by the first predetermined angle relative to a plane extending tangentially from a point on the circumference of the core member 50, where the light guide member 40 contacts the core member 50. With this arrangement, the pumping light Lin guided within the light guide member 40 enters the core member 50 such that the pumping light Lin circulates in the circumferential direction within the core member 50.

Second Representative Fiber Laser Oscillator (FIGS. 5(A) to 5(C) and FIGS. 6(A) to 6(C))

FIGS. 5(A) and 5(B) respectively show a schematic external view of a second representative fiber laser oscillator 100 in a side view and a plan view. In FIGS. 5(A) to 5(C) and FIGS. 6(A) to 6(C), like members are given the same reference numerals as in the first representative fiber laser oscillator 1 and description of these elements will not be repeated. In addition to the optical fiber 10, the pumping light emitting device 30, the light guide member 40 and the core member 50, lenses 60 and total reflection mirrors 62 constitute the second representative fiber laser oscillator 100.

The second representative fiber laser oscillator 100 is different from the first representative fiber laser oscillator 1 in that the core member 50 is configured to have a substantially flat plate-shaped configuration. In addition, the lenses 60 and the total reflection mirrors 62 are newly incorporated. The second representative fiber laser oscillator 100 will be hereinafter described mainly in connection with the different constructions from the first representative fiber laser oscillator 1.

Since the core member 50 has a substantially flat plate-shaped configuration, the pumping light Lin is emitted in order that the pumping light Lin travels in a direction perpendicular to a direction of thickness (indicated by t50 in FIG. 5(A)) of the core member 50. Reflecting devices, including the lens 60 and the total reflection mirror 62, are positioned to oppose each of the end surfaces 50R and 50L of the core member 50 extending perpendicular to the traveling direction of the pumping light Lin. Therefore, the pumping light Lin may be totally reflected by the reflecting devices for reciprocation within the core member 50.

The lenses 60 are positioned to be spaced from the respective end surfaces 50R and 50L by a focal distance f so that the pumping light Lin outgoing from the end surfaces 50R and 50L may be converted into parallel beams. Each parallel beam thus converted is transmitted to the corresponding total reflection mirror 62 in a direction perpendicular to the mirror surface so that the parallel beams are reflected in a direction opposite to the transmission direction. The reflected pumping light Lin in the form of a parallel beam then enters the corresponding lens 60 so that the pumping light Lin is converged or focused onto the corresponding end surface 50R or 50L. In this way, the pumping light Lin reciprocates within the core member 50 after having entered the core member 50.

Also in this representative embodiment, the core member 50 may be made of a material that has a refractive index similar to or equal to the refractive index of the cladding material 14, in order to confine the incident pumping light Lin within the core member 50. In this representative embodiment shown in FIGS. 5(A) and 5(B), the pumping light Lin exits out from the end surfaces 50L and 50R of the core member 50. However, the outgoing light Lin is reflected back to the end surfaces 50L and 50R without leakage. Therefore, the incident pumping light Lin may still be considered as confined within the core member 50. The term "confine" is used in this specification in that sense.

In an alternative embodiment, the lenses 60 and the total reflection mirrors 62 may be replaced with total reflection coatings formed on the end surfaces 50R and 50L, in order to totally reflect the pumping light Lin.

FIG. 5(C) shows a cross sectional view taken along line VC-VC in FIG. 5(B). As shown in FIG. 5(C), the optical fiber 10 is configured to have a cylindrical configuration. The optical fiber 10 has the core portion 12 and the cladding portion 14 about the core portion 12 in the same manner as in the first representative embodiment. Of course, the optical fiber 10 may have alternative configurations such as of a polygonal rod for example, instead of being limited to a cylindrical configuration.

The optical fiber 10 is arranged to extend along opposite surfaces of the core member 50. The surfaces extend perpendicular to the direction of thickness of the core member 50 and serve to totally and repeatedly reflect the incident pumping light Lin while the pumping light Lin travels. More specifically, the optical fiber 10 (i.e., a single optical fiber) is turned back several times to form parallel fiber portions that are positioned on either of the opposite surfaces of the core member 50. Each fiber portion has a longitudinal axis that extends parallel to the traveling direction of the pumping light L (i.e., the right and left directions as viewed in FIG. 5(B)).

Figure 6:
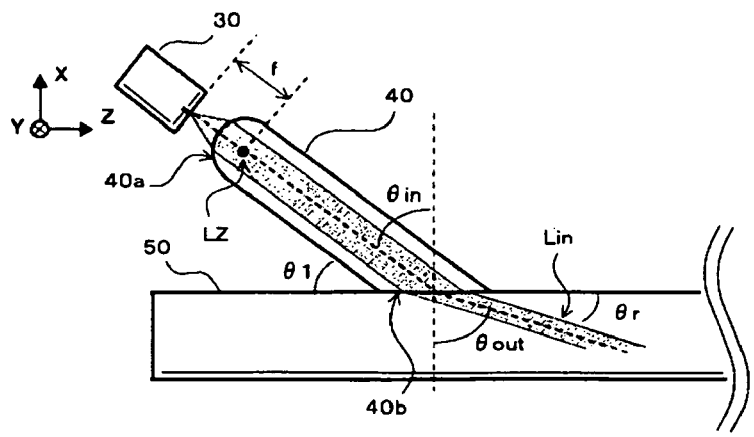
FIGS. 6(A) to 6(C) are explanatory views illustrating the arrangement of a pumping light emitting device, a light guide member and a core member, the traveling path of the pumping light within the core member, and the total reflection of the pumping light that enters the optical fiber.
Figure 6:
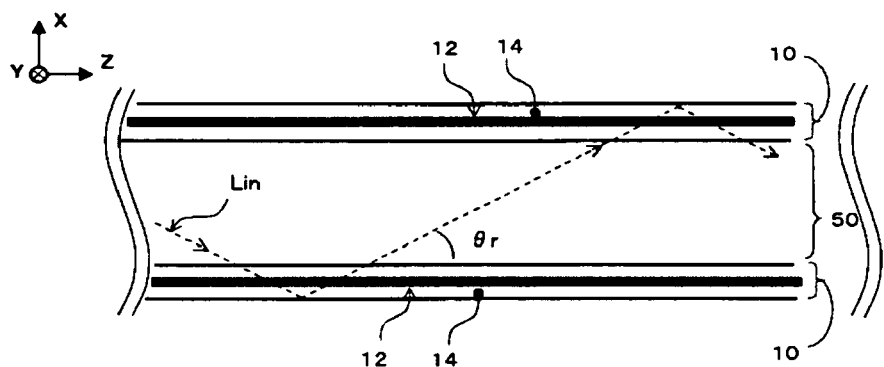
Figure 6:
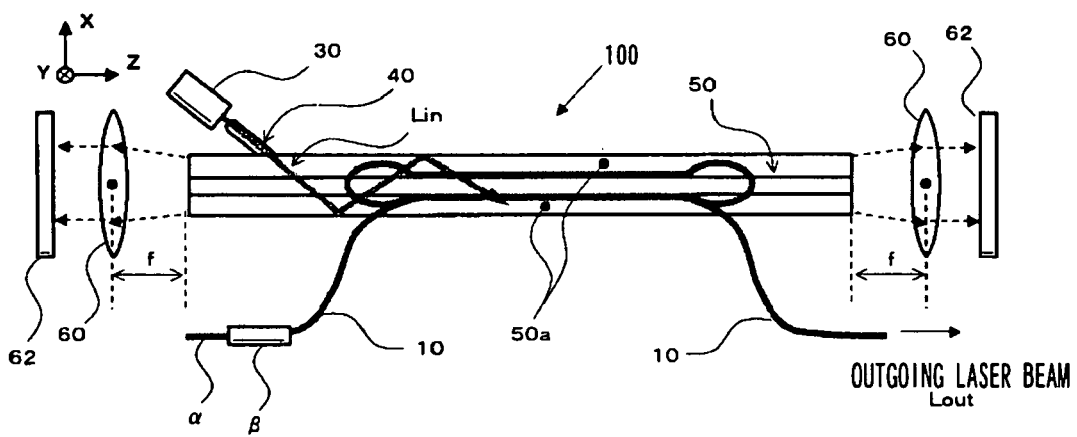

An arrangement of the pumping light emitting device 30, the light guide member 40, and the core member 50, is shown in FIG. 6(A) together with the state of transmission of the pumping light Lin.

As shown in FIG. 6(A), the light guide member 40 is positioned such that the axis LZ of the lens 40a extends substantially parallel to a plane that is perpendicular to the direction of thickness of the core member 50 (i.e., one of the surfaces of core member 50). In addition, the light guide member 40 is inclined by a first predetermined angle $\theta 1$, relative to a plane that is perpendicular to the direction of thickness of the core member 50. More specifically, the first predetermined angle $\theta 1$ is set such that an angle $\theta r$ between the pumping light Lin (within the core member 50) and the plane perpendicular to the direction of thickness of the core member 50 provides for total reflection of the pumping light Lin within the core member 50. Preferably, the refractive index n50 of the core member 50 may be chosen to be smaller than the refractive index n40 of the light guide member 40, so that an outgoing angle $\theta$out of the pumping light Lin becomes greater than an incident angle θin as shown in FIG. 6(A). As a result, the angle θr between the pumping light Lin and the plane perpendicular to the direction of thickness of the core member 50 becomes smaller.

In the embodiment shown in FIG. 6(A), the light emitting device 30 is positioned to be spaced from the lens 40a by the focal distance f of the lens 40a in order to covert the pumping light Lin into a parallel beam. However, as discussed in connection with the first representative embodiment, the pumping light emitting device 30 may be spaced away by a distance (f+Δf) or (f−Δf) that may be referred to as a distance approximate to the focal distance f if the setting is made such that the pumping light Lin is totally reflected within the core member 50. In such a case, the light guide member 40 serves to converge or focus the incident pumping light in the direction of the major axis as discussed in connection with FIGS. 1(D) and 1(E).

FIG. 6(B) shows a representative path of the pumping light Lin that enters the optical fiber 10 as it is totally reflected within the core member 50 when the angle θr between the pumping light Lin and the plane perpendicular to the direction of thickness of the core member 50 is set to provide for total reflection. Assuming that the core member 50 has a refractive index n50 and the cladding portion 14 of the optical fiber 10 has a refractive index n14, the refractive index n50 and the refractive index n14 are equal to or substantially equal to each other in case of FIG. 6(B). The pumping light Lin may effectively enter the optical fiber 10 as it is reciprocally totally reflected.

Alternatively, as shown in FIG. 6(C), the core member 50, having the optical fiber 10 disposed on opposite surfaces, may be interleaved between transparent portions 50a having refractive indexes that are equal to the refractive index n50 of the core member 50. As a result, the optical fiber 10 is disposed within a core structure that includes the core member 50 and the transparent portions 50a. For example, the transparent portions 50a may be made of ceramic precursor. Although not shown in the drawings, the optical fiber 10 may be partly or totally embedded within the core member 50.

In the same manner as in the first representative embodiment, in order to position the light guide member 40 relative to the core member 50, ceramic precursor, e.g., such as polysilazane for example, having a refractive index equal to or substantially equal to the refractive index of the light guide member 40, may be used for fixing the position of the light guide member 40 (e.g., through bonding).

The second representative fiber laser oscillator 100 will be further described in connection with a dimensional aspect of a practically applicable design.

In case of the core member 50 having a rectangular parallelepiped configuration shown in FIGS. 5(A) and 5(B), thickness t50, width W50, and length L50 of the core member 50 may be respectively set to 1 mm, 10 mm, and 300 mm. The optical fiber 10 may be wound around the core member 50 such that the optical fiber 10 has straight contact portions (having a contact length of about 200 mm) contacting substantially central regions E50 in the longitudinal direction of opposite surfaces of the core member 50. These surfaces extend perpendicular to the direction of the thickness of the core member 50. According to this design, each of the opposite surfaces has an area of 10 mm×300 mm. Ceramic precursor, such as polysilazane, may be used for bonding the optical fiber 10 to the core member 50.

For example, the optical fiber 10 for use with this core member 50 may have a core portion 12 with an outer diameter of about 0.100 mm and the cladding portion 14 with an outer diameter of about 0.125 mm. The optical fiber 10 may be wound around the core member 50 approximately eighty revolutions (0.125*80=10(mm)=W50).

In addition, the refractive index n40 of the light guide member 40, the refractive index n50 of the core member 50, the refractive index n14 of the cladding portion of the optical fiber 10, are respectively set to 1.82, 1.46 and 1.46. Further, the thickness t40 of the light guide member 40 is set to 0.1 mm. The first predetermined angle θ1 is set to 40°. In this case, about 5% of the pumping light Lin returns to the incident position of the pumping light Lin (i.e., the position on the contact surface of the light guide member 40 with the core member 50 in this case) each time that the pumping light Lin is reflected. However, about 90% of the pumping light Lin may be absorbed into the core portion 12 when the pumping light Lin reciprocates by three times. Therefore, it is possible to realize a very high oscillating efficiency.

According to the first and second representative fiber laser oscillators 1 and 100 described above, the ratio of volume of the core portion 12 to the total volume of transmissible region of the pumping light Lin is greater than the ratio in the conventional device. Therefore, the probability of collision of the pumping light Lin with the core portion 12 may be large, so that the oscillating efficiency may be improved.

Because the oscillating efficiency can be improved in this way and because the pumping light Lin is circulated or reciprocated, it is possible to realize a fiber laser oscillator having a smaller size while having a relatively large output.

Figure 7:
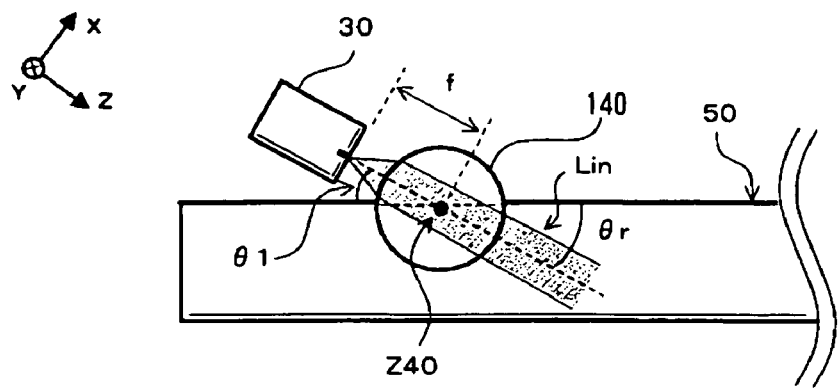
FIGS. 7(A) to 7(C) are explanatory views showing alternative configurations of the light guide member and the methods of assembling such light guide members to the core member.
Figure 7:
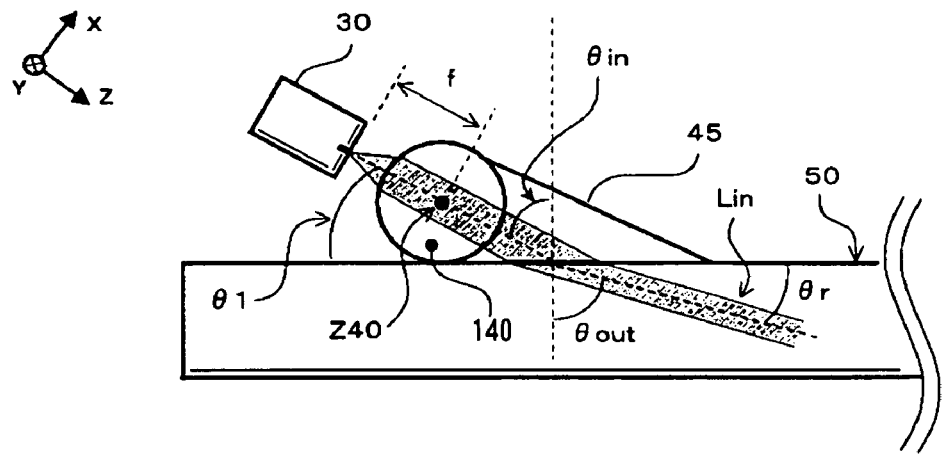
Figure 7:
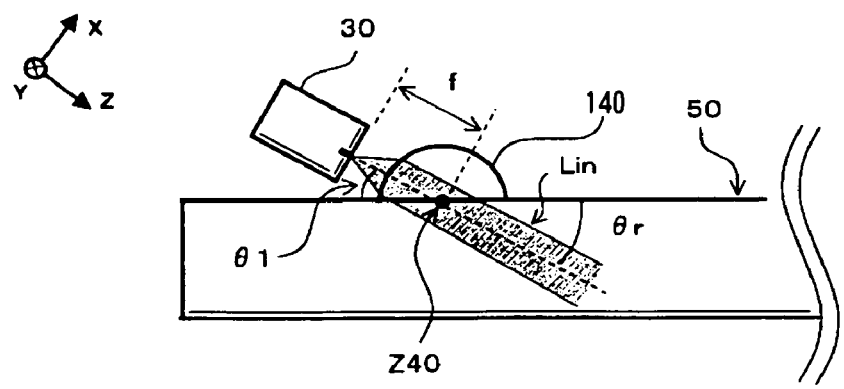
Figure 8:
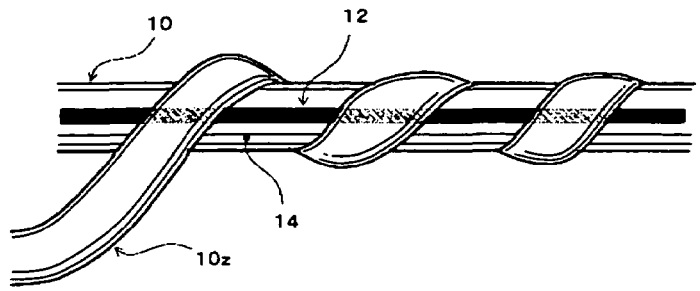
FIGS. 8(A) to 8(D) are explanatory views showing the conventional fiber laser oscillator.
Figure 8:
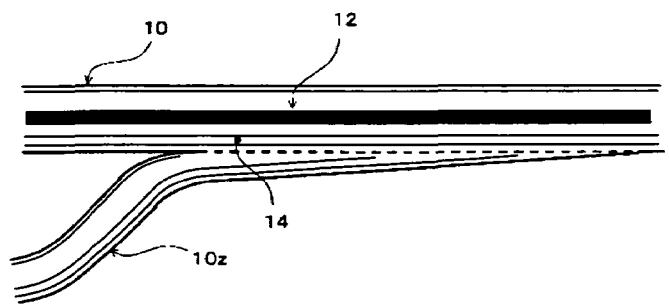
Figure 8:
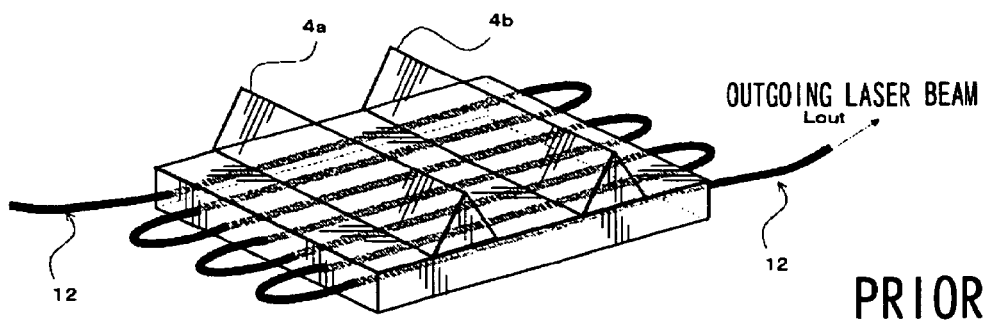
Figure 8:
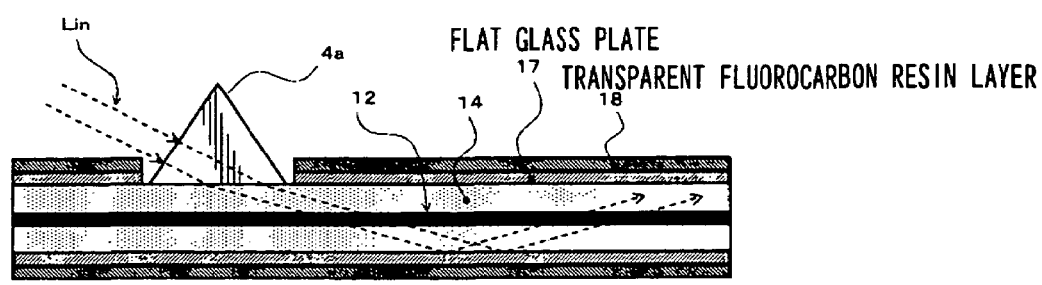
Figure 9:
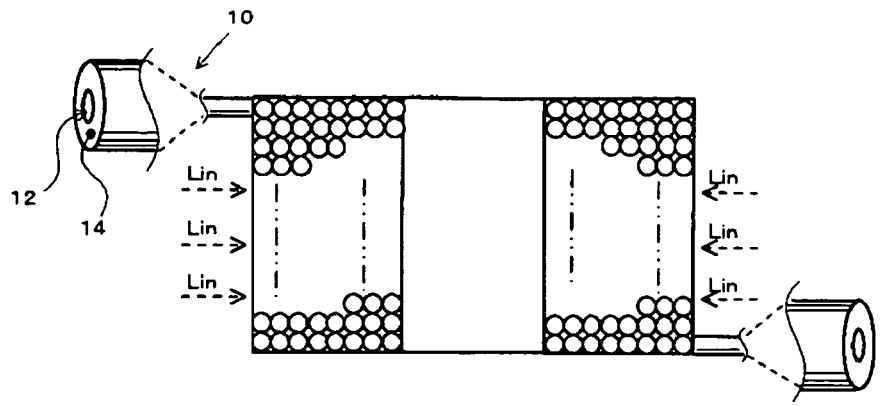
FIGS. 9(A) to 9(C) are explanatory views showing another conventional fiber laser oscillator.
Figure 9:
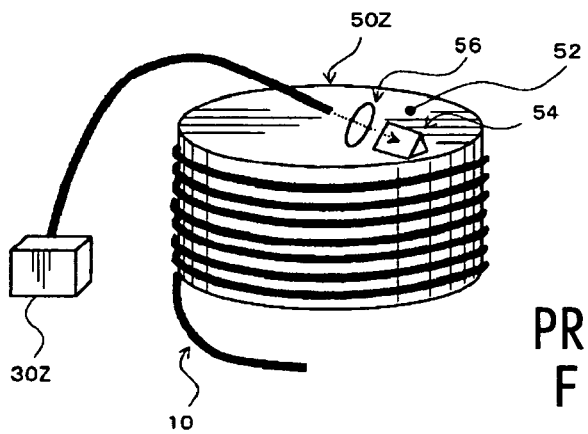
Figure 9:
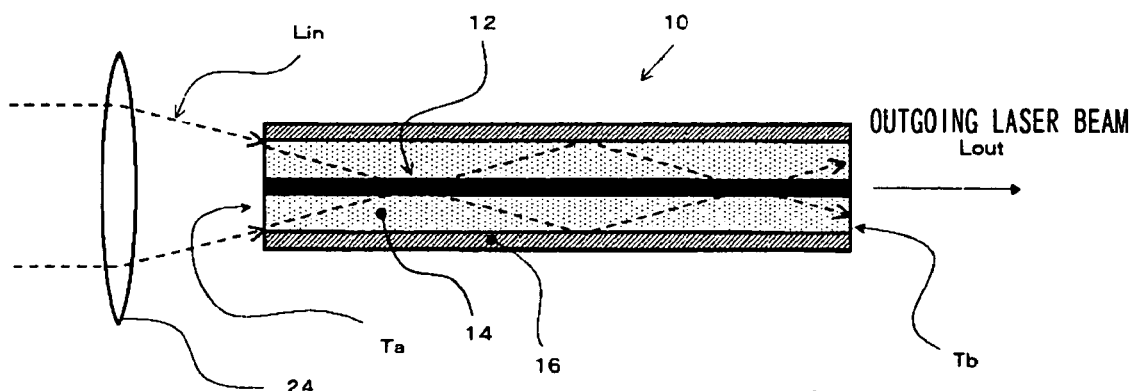

Other Representative Embodiments of Light Guide Member (FIGS. 7(A) to 7(C))

Other possible configurations of the light guide member 40 and methods of assembling such differently configured light guide members 140 to the core member 50 will now be described with reference to FIGS. 7(A) to 7(C). The differently configured light guide members 140 can be adapted to the first representative fiber laser oscillator 1 as well as the second representative fiber laser oscillator 100.

Although the light guide member 40 used in the first and second representative fiber laser oscillators 1 and 100 has a flat plate-shaped configuration, the light guide member 140 shown in FIGS. 7(A) to 7(C) has a substantially cylindrical configuration. The light guide member 140 having such a substantially cylindrical configuration can converge the light that is emitted from a direction perpendicular to an axis Z40 of a cylinder.

Thus, the pumping light Lin emitted from the pumping light emitting device 30 can be converted into a parallel beam with respect to the major axis direction by the cylindrical light guide member 140 when the pumping light emitting device 30 is positioned such that the major axis direction is perpendicular to the axis Z40 and the pumping light emitting device 30 is spaced away from the axis Z40 by the focal distance f. If the setting is made to totally reflect the pumping light Lin within the core member 50, the pumping light emitting device 30 may be positioned spaced away from the axis Z40 by a distance (f+Δf) or (f−Δf) (see FIGS. 1(D) and 1(E)) that is a distance approximate to the focal distance f. In such a case, the light guide member 140 may converge the incident pumping light Lin in the direction of the major axis as described previously in connection with FIGS. 1(D) and 1(E).

In the arrangement shown in FIG. 7(A), the cylindrical light guide member 140 is partly embedded within the core member 50. Therefore, a partial cylindrical recess conforming to the configuration of a part of the light guide member 140 may be formed in the surface of the core member 50. This recess surface is adapted to contact the light guide member 140.

In the arrangement shown in FIG. 7(B), the cylindrical light guide member 140 is mounted to contact with the surface of the core member 50. However, the core member 50 surface does not have a recess. In this case, a filling portion 45 made of ceramic precursor, such as polysilazane for example, may be formed so as to extend along a path of the pumping light Lin before entering the light core member 50 and after transmitting through the light guide member 140.

In the arrangement shown in FIG. 7(C), the cylindrical light guide member 140 is cut along a plane that is parallel to the axis Z40 so that the light guide member 140 has a substantially semi-cylindrical configuration. The light guide member 140, having such a substantially semi-cylindrical configuration, is mounted to the surface of the core member 50, which does not have any recesses. In this specification, the term "substantially cylindrical configuration" is used to mean a semi-cylindrical configuration or a configuration corresponding to a part of a cylinder since these configurations can be obtained by removing a part of a cylinder.

The pumping light emitting device 30 may be positioned such that the traveling direction of the incident pumping light Lin is inclined by the first predetermined angle θ1 relative to the surface of the core member 50, to which the light guide member 140 is mounted.

Assuming that the refractive indexes of the light guide member 140, the filling portion 45, and the core member 50, are respectively n140, n45 and n50, the refractive indexes n140 and n50 may be set to be equal to or substantially equal to each other in the configuration shown in FIG. 7(A). In the arrangement shown in FIG. 7(B), the refractive indexes n140 and n45 may be set to be equal to or substantially equal to each other. In addition, the refractive index n50 may be set to be smaller than the refractive indexes n140 and n45. In the arrangement shown in FIG. 7(C), the refractive indexes n140 and n50 may be set to be equal to or substantially equal to each other.

With the various configurations of the light guide member 140 and with the methods of mounting such variously configured light guide member 140 to the core member 50 shown in FIGS. 7(A) to 7(C), the light guide member 140 may be formed to have relatively simple configurations. Therefore, any potential errors that may be caused due to the configuration of parts to be assembled may be reduced or minimized. As a result, the oscillating efficiency may be further improved.

In addition, adjustment of position of the light guide member 140 relative to the core member 50 in order to set the first predetermined angle θ1 is no longer necessary for the light guide member 140. It is only necessary to adjust the position of the pumping light emitting device 30 in order to set the first predetermined angle θ1. Therefore, any potential errors that may be caused due to positioning of parts can be reduced or minimized. As a result, the oscillating efficiency may be further improved.

As described above, according to the above embodiments, it is possible to further improve the oscillating efficiency and to realize a fiber laser oscillator that is smaller in size while still providing a high output.

OTHER POSSIBLE EMBODIMENTS

The present invention is not limited to the configurations, arrangements, or the methods of positioning of the optical fiber 10 described in the above embodiments. Various changes, additions, or elimination of parts in the above embodiments can be made without departing from the teachings and subject matter of the present invention. Following are some examples of such changes, additions or eliminations.

The numerical values disclosed in this specification should be considered to be only examples and should not be considered as limiting the invention.

Although a semiconductor laser is used to generate the pumping light Lin in the above embodiments, any other appropriate devices may be used for generating the pumping light L.

Although the representative fiber laser oscillators have been described in connection with embodiments incorporating the array-type laser diode shown in FIG. 10(B) as the pumping light emitting device 30, the stack-type laser diode having a plurality of array-type laser diodes stacked in the major axis direction as shown in FIG. 10(A) may also be used as the pumping light emitting device 30.

Although one pumping light emitting device 30 and one light guide member 40 (140) are shown mounted to the core member 50 in the above embodiments, plural sets of the pumping light emitting devices 30 and the light guide members 40(140) may be mounted to the core member 50. With this arrangement, it is possible to easily obtain a higher output for the outgoing laser beam Lout.

The circumferential surface of the optical fiber 10, in particular a part of the circumferential surface through which the pumping light Lin enters, may be coated with reflection reduction coating in order to further improve efficiency.

A mirror for totally reflecting the outgoing laser beam Lout from the optical fiber 10 may be used in place of the FBGα and the fiber connector β.

Although the optical fiber 10 used in the above representative fiber laser oscillators 1, 100, is formed by the core portion 12 and the (single) cladding portion 14, it is possible to use the optical fiber 10 formed by the core portion 12, a first cladding portion 14, and a second cladding portion 16.

Finally, the fiber laser oscillator of the present invention may be applied to various machines and apparatus, such as a laser machining apparatus for example, which utilize a laser beam.

This invention claims:

1. A fiber laser oscillator comprising:
 a rod-shaped optical fiber having a longitudinal axis and including a rod-shaped core portion and a cladding portion covering the circumference of the core portion, wherein the core portion contains laser activation material and wherein the cladding portion has a refractive index smaller than a refractive index of the core portion;
 a pumping light emitting device arranged and constructed to emit a pumping light, wherein the pumping light diverges in both a major axis direction and a minor axis direction as the pumping light travels from the pumping light emitting device;
 a light guide member having an integral cylindrical entrance surface constructed to receive the pumping light and constructed to direct the pumping light along a longitudinal axis into the light guide member, said light guide member arranged and constructed to provide a guide for the pumping light emitted from the pumping light emitting device; and
 a core member arranged and constructed to receive the pumping light under the guidance of the light guide member and to confine the pumping light therein, said light guide member disposed on an outer side of the core member;
 wherein the core member is configured to have a cylindrical, annular, or a hollow spherical configuration;

wherein the optical fiber is positioned such that at least a part of the optical fiber is embedded within the core member or such that the optical fiber is wound around a surface of the core member;

wherein the light guide member has a pumping light receiving surface positioned adjacent to the pumping light emitting device, so that the pumping light emitted from the pumping light emitting device is guided within the light guide member;

wherein the light guide member has an opposite surface positioned opposite to the pumping light receiving surface and defining a contact surface contacting the circumference of a mating surface of the core member, wherein the light guide member is positioned relative to the core member such that the pumping light outgoing from the light guide member is inclined by a first predetermined angle relative to a plane tangential to the mating surface of the circumference of the core member to which the contact surface of the light guide member contacts, so that the pumping light guided within the light guide member enters the core member via the opposite surface contacting with the core member and circulates along the circumference of the core member.

2. The fiber laser oscillator as in claim 1, wherein the core member has a cylindrical configuration and having a top surface and a bottom surface;

wherein the pumping light enters the core member such that the pumping light circulates in the circumferential direction of the cylindrical configuration; and wherein the light guide member is further positioned relative to the core member such that the pumping light outgoing from the light guide member is inclined relative to the circumference of the core member by a second predetermined angle as viewed in a direction perpendicular to an axis of the core member, so that the circulating pumping light is totally reflected by a surface corresponding to the top surface and/or a surface corresponding to the bottom surface of the cylindrical core member.

3. The fiber laser oscillator as in claim 2, wherein the second predetermined angle is set to such an angle that the pumping light entering the core member does not transmit through the contact surface of the light guide member contacting with the core member during a predetermined number of reciprocations of transmission of the pumping light between the top surface and the bottom surface of the core member through total reflection caused when the pumping light reaches the surface corresponding to the top surface and/or the surface corresponding to the bottom surface.

4. A fiber laser oscillator comprising:

a rod-shaped optical fiber having a longitudinal axis and including a rod-shaped core portion and a cladding portion covering the circumference of the core portion, wherein the core portion contains laser activation material and wherein the cladding portion has a refractive index smaller than a refractive index of the core portion;

a pumping light emitting device arranged and constructed to emit a pumping light, wherein the pumping light diverges in both a major axis direction and a minor axis direction as the pumping light travels from the pumping light emitting device;

a light guide member having an integral cylindrical entrance surface constructed to receive the pumping light and constructed to direct the pumping light along a longitudinal axis into the light guide member, said light guide member arranged and constructed to provide a guide for the pumping light emitted from the pumping light emitting device; and a core member arranged and constructed to receive the pumping light under the guide of the light guide member and to confine the pumping light therein, said light guide member disposed on an outer side of the core member; wherein the core member has an end surface extending perpendicular to a traveling direction of the pumping light within the core member;

and a reflection device disposed at or adjacent to the end surface of the core member; wherein the core member is configured to have a flat plate-shaped configuration;

wherein the optical fiber is turned back at a plural number of times and is positioned relative to the core member such that (a) the optical fiber has fiber portions with longitudinal axes extending parallel to the traveling direction of the pumping light that has entered the core member and (b) at least a part of each fiber portion is embedded within the core member or each fiber portion extends along a surface of the core member;

wherein the light guide member has a pumping light receiving surface positioned adjacent to the pumping light emitting device, so that the pumping light emitted from the pumping light emitting device is guided within the light guide member;

wherein the light guide member has an opposite surface positioned opposite to the pumping light receiving surface and defining a contact surface contacting a mating surface of the core member extending perpendicular to a direction of thickness of the core member, wherein the light guide member is positioned relative to the core member such that the pumping light outgoing from the light guide member is inclined by a first predetermined angle relative to the mating surface of the core member, so that the pumping light guided within the light guide member enters the core member via the contact surface and travels within the core member in a direction perpendicular to the direction of thickness of the core member; and wherein the reflecting device reflects the pumping light, so that the pumping light reciprocates within the core member.

5. The fiber laser oscillator as in claim 4, wherein the cylindrical entrance surface serves as a cylindrical lens defining the pumping light receiving surface, the cylindrical lens having a lens axis and a focal distance; and wherein the light emitting device is positioned such that the major axis direction of the emitted pumping light is perpendicular to the lens axis and that the light emitting device is spaced from the lens axis by a distance equal to or substantially equal to the focal distance; and wherein the light guide member is arranged and constructed to convert the pumping light emitted from the pumping light emitting device into a parallel beam in the major axis direction or to converge the emitted pumping light in the major axis direction before entering the core member.

6. The fiber laser oscillator as in claim 5, wherein the light guide member has a substantially cylindrical configuration;

wherein the contact surface of the light guide member is defined by at least a part of a circumferential surface of the light guide member; and wherein the mating surface of the core member is defined as a flat surface or has a recess conforming to the configuration of the contact surface.

7. The fiber laser oscillator as in claim 4,
wherein the cylindrical entrance surface serves as a cylindrical lens defining the pumping light receiving surface, the cylindrical lens having a lens axis and a focal distance; and
wherein the light emitting device is positioned such that the major axis direction of the emitted pumping light is perpendicular to the lens axis and that the light emitting device is spaced from the lens axis by a distance equal to or substantially equal to the focal distance; and
wherein the light guide member is arranged and constructed to convert the pumping light emitted from the pumping light emitting device into a parallel beam in the major axis direction or to converge the emitted pumping light in the major axis direction before entering the core member.

8. The fiber laser oscillator as in claim 7,
wherein the light guide member has a substantially cylindrical configuration;
wherein the contact surface of the light guide member is defined by at least a part of a circumferential surface of the light guide member; and
wherein the mating surface of the core member is defined as a flat surface or has a recess conforming to the configuration of the contact surface.

9. A fiber laser oscillator comprising:
an optical fiber arranged and constructed to generate a laser light when a pumping light enters the optical fiber;
a pumping light emitting device arranged and constructed to emit the pumping light;
a light guide member having an integral cylindrical entrance surface constructed to receive the pumping light and constructed to direct the pumping light along a longitudinal axis into the light guide member, said light guide member arranged and constructed to provide a guide for the pumping light emitted from the pumping light emitting device; and
a core member having a refractive index arranged and constructed to receive the pumping light under the guidance of the light guide member and to substantially confine the pumping light therein, said light guide member disposed on an outer side of the core member;
wherein the optical fiber extends along or within the core member and at least partly contacts the core member when viewed in cross section; and
wherein the pumping light entering the core member circulates or reciprocates within the core member without substantial loss of the pumping light to the outside of the core member.

10. The fiber laser oscillator as in claim 9,
wherein the core member has a circumference and is configured such that the pumping light travels helically within the core member along a circumferential direction; and
wherein the optical fiber extends so as to be wound around the circumference at least one revolution.

11. The fiber laser oscillator as in claim 10,
wherein the core member has a substantially cylindrical tubular configuration having a cylindrical circumferential surface, a top surface, and a bottom surface; and
wherein the pumping light is totally reflected at the top surface and the bottom surface, so that the pumping light reciprocates between the top surface and the bottom surface.

12. The fiber laser oscillator as in claim 11,
wherein the optical fiber extends helically along the circumferential direction of the core member.

13. The fiber laser oscillator as in claim 9,
wherein the core member has a longitudinal direction and is configured such that the pumping light travels in a zigzag path in the longitudinal direction; and
wherein the optical fiber extends in the longitudinal direction of the core member.

14. The fiber laser oscillator as in claim 13,
wherein the core member has opposing surfaces extending substantially parallel to each other in the longitudinal direction and opposing end surfaces; and
wherein the pumping light is totally reflected at the opposing surfaces as the pumping light travels within the core member; and
further comprising reflectors disposed at or adjacent to the end surfaces of the core member, and
wherein the reflectors are arranged and constructed to totally reflect the pumping light that reaches the end surfaces or exits from the end surfaces.

15. The fiber laser oscillator as in claim 14,
wherein the core member has a substantially rectangular parallelepiped configuration.

16. The fiber laser oscillator as in claim 14,
wherein the optical fiber is turned back a predetermined number of times, so that the optical fiber has fiber portions that extend in the longitudinal direction of the opposing surface of the core member.

17. The fiber laser oscillator as in claim 1, wherein:
the light guide member includes a longitudinal end opposite the integral cylindrical entrance surface, and
said longitudinal end contacts a predetermined angle to the core member such that the pumping light enters the core member at an angle for reflection of the pumping light within the core member.

18. The fiber laser oscillator as in claim 4, wherein:
the light guide member includes a longitudinal end opposite the integral cylindrical entrance surface, and
said longitudinal end contacts a predetermined angle to the core member such that the pumping light enters the core member at an angle for reflection of the pumping light within the core member.

19. The fiber laser oscillator as in claim 9, wherein:
the light guide member includes a longitudinal end opposite the integral cylindrical entrance surface, and
said longitudinal end contacts a predetermined angle to the core member such that the pumping light enters the core member at an angle for reflection of the pumping light within the core member.

* * * * *